US011794841B2

United States Patent
Erhard et al.

(10) Patent No.: US 11,794,841 B2
(45) Date of Patent: Oct. 24, 2023

(54) FUEL TANK FOR A MOTOR VEHICLE, IN PARTICULAR FOR A MOTORCYCLE, AND METHOD FOR PRODUCING A FUEL TANK

(71) Applicant: Bayerische Motoren Werke Aktiengesellschaft, Munich (DE)

(72) Inventors: Daniel Erhard, Fuerstenfeldbruck (DE); Moritz Holtdirk, Lippstadt (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 340 days.

(21) Appl. No.: 16/890,853

(22) Filed: Jun. 2, 2020

(65) Prior Publication Data

US 2020/0290697 A1 Sep. 17, 2020

Related U.S. Application Data

(63) Continuation of application No. PCT/EP2018/076115, filed on Sep. 26, 2018.

(30) Foreign Application Priority Data

Dec. 8, 2017 (DE) ...................... 10 2017 222 256.5

(51) Int. Cl.
 *B62J 35/00* (2006.01)
 *B29D 22/00* (2006.01)
 (Continued)

(52) U.S. Cl.
 CPC ............ *B62J 35/00* (2013.01); *B29D 22/003* (2013.01); *B60K 15/03* (2013.01);
 (Continued)

(58) Field of Classification Search
 CPC ..................... B62J 35/00; B60K 15/03; B60K 2015/03032; B60K 2015/03493;
 (Continued)

(56) References Cited

U.S. PATENT DOCUMENTS 4,174,245 A 11/1979 Martineau
4,987,777 A * 1/1991 Bourret .................... B62J 35/00
 220/663

(Continued)

FOREIGN PATENT DOCUMENTS

BE 1015547 A3 6/2005
CN 1847078 A 10/2006
(Continued)

OTHER PUBLICATIONS

Not slippery when wet, TPE gets a grip: Plastics Today: Feb. 1, 2012; 5 pages.*

(Continued)

*Primary Examiner* — Stephen J Castellano
(74) *Attorney, Agent, or Firm* — Crowell & Moring LLP

(57) ABSTRACT

A fuel tank for a motor vehicle, a method for producing the fuel tank, and a single-track motor vehicle including the fuel tank, where the fuel tank includes at least two parts that are joined together where the parts delimit a receiving chamber for receiving a fuel. At least one of the two parts is produced by a co-injection moulding process.

7 Claims, 3 Drawing Sheets

(51) Int. Cl.
  *B60K 15/03* (2006.01)
  *B29K 21/00* (2006.01)
  *B29L 31/00* (2006.01)
(52) U.S. Cl.
  CPC . *B29K 2021/003* (2013.01); *B29L 2031/7172* (2013.01); *B60K 2015/03032* (2013.01); *B60K 2015/03493* (2013.01)
(58) Field of Classification Search
  CPC ............ B60K 15/073; B60K 15/03177; B60K 2015/03039; B29K 2021/003
  See application file for complete search history.

(56) References Cited

U.S. PATENT DOCUMENTS

| | | | |
|---|---|---|---|
| 2003/0198768 A1* | 10/2003 | Delbarre | C08L 23/0815 428/36.6 |
| 2006/0004144 A1* | 1/2006 | Kimura | C08L 53/00 525/198 |
| 2006/0151505 A1 | 7/2006 | Kobayashi | |
| 2010/0007115 A1* | 1/2010 | Wootton | B62J 25/02 2/93 |
| 2016/0046184 A1 | 2/2016 | Luehn et al. | |
| 2017/0101146 A1* | 4/2017 | Jones, Jr. | B62J 1/02 |
| 2019/0092413 A1* | 3/2019 | Tabuchi | B62J 35/00 |

FOREIGN PATENT DOCUMENTS

| | | |
|---|---|---|
| CN | 103889757 A | 6/2014 |
| CN | 203752895 U | 8/2014 |
| CN | 105073471 A | 11/2015 |
| DE | 199 41 785 A1 | 3/2001 |
| DE | 100 64 334 A1 | 6/2002 |
| DE | 10 2004 047 209 A1 | 4/2006 |
| DE | 10 2013 004 926 A1 | 9/2014 |
| DE | 10 2014 106 047 A1 | 11/2015 |
| DE | 10 2016 214 059 A1 | 2/2018 |
| EP | 1 095 962 A2 | 5/2001 |
| EP | 1 108 653 A1 | 6/2001 |
| JP | 2004-98886 A | 4/2004 |
| JP | 2006-321309 A | 11/2006 |
| JP | 2015-205655 A | 11/2015 |
| WO | WO 2014/147138 A1 | 9/2014 |

OTHER PUBLICATIONS

PCT/EP2018/076115, International Search Report dated Dec. 7, 2018 (Two (2) pages).
German Search Report issued in German application No. 10 2017 222 256.5 dated Aug. 7, 2918, with Statement of Relevancy (Seven (7) pages).
U.S. Patent Application, "Fuel Tank for a Motor Vehicle, and Method for Producing a Fuel Tank", filed Jun. 2, 2020, Inventor Daniel Erhard et al.
English-language Chinese Office Action issued in Chinese application No. 201880068450.0 dated Nov. 18, 2022 (Six (6) pages).
English-language Chinese Office Action issued in Chinese application No. 201880068450.0 dated Jul. 31, 2023 (Eight (8) pages).

* cited by examiner

FUEL TANK FOR A MOTOR VEHICLE, IN PARTICULAR FOR A MOTORCYCLE, AND METHOD FOR PRODUCING A FUEL TANK

CROSS REFERENCE TO RELATED APPLICATIONS

This application is a continuation of PCT International Application No. PCT/EP2018/076115, filed Sep. 26, 2018, which claims priority under 35 U.S.C. § 119 from German Patent Application No. 10 2017 222 256.5, filed Dec. 8, 2017, the entire disclosures of which are herein expressly incorporated by reference.

BACKGROUND AND SUMMARY OF THE INVENTION

A fuel tank for a motor vehicle is specified. The fuel tank is preferably a fuel tank for a motorized bicycle, in particular a fuel tank for a motorcycle. Furthermore, a single track motor vehicle having a fuel tank and a method for producing a fuel tank are specified.

Fuel tanks for motor vehicles, in particular for motorcycles, are already well known from the general prior art and, in particular, from the series production of vehicles. A fuel tank of this type has at least one receiving space for receiving fuel, in particular liquid fuel. For example, an internal combustion engine for driving the respective motor vehicle can be operated by means of the fuel.

Fuel tanks of this type for motorcycles can be produced, for example, by way of blow molding or by way of rotational molding. It is disadvantageous in the case of the methods that the design of the fuel tanks is extremely restricted here. The integration of further components is also possible merely to a highly restricted extent. Furthermore, a sufficient surface quality is often not produced, with the result that the fuel tanks which are produced cannot be used as visible parts.

DE 199 41 785 A1 has disclosed a method for producing a fuel container, in the case of which shell parts made from plastic are first of all manufactured in an injection molding method, and the shell parts are subsequently welded to one another.

It is disadvantageous in the case of the fuel tanks which are known in the prior art that, in addition to the main functions for receiving a fuel, such as requirements of the tightness of the fuel tank, they usually either do not fulfill any additional functions at all, or else elements with additional functions have to be integrated in a costly and time-intensive manner.

It is therefore an object to be achieved of at least some embodiments to specify a fuel tank for a motor vehicle, in particular for a motorcycle, which fuel tank has additional functions, such as with regard to additional active and/or passive safety. Further objects are to specify a single track motor vehicle having a fuel tank of this type, and to specify a method for producing a fuel tank.

In accordance with at least one embodiment, a fuel tank which is described here has at least two part bodies which are connected to one another and configure a receiving space for receiving fuel. Here, at least one of the two part bodies is produced by way of a multiple component injection molding method. The multiple component injection molding method can be, for example, a two-component injection molding method. Furthermore, the other one of the two part bodies can also be produced by way of an injection molding method. Moreover, the two part bodies can also be produced by way of a multiple component injection molding method or by way of a two-component injection molding method.

The part bodies can be configured, for example, in each case as shell elements. Furthermore, for example, one part body can be configured as a well element and the other part body can be configured as a cover element.

The fuel tank is preferably configured as a fuel tank for a motor vehicle, in particular as a fuel tank for a single track motor vehicle, such as a motorcycle.

In accordance with a further embodiment, the part body which is produced by way of the multiple component injection molding method has at least one first injection molded element and at least one second injection molded element which are connected directly to one another and which are formed from different materials. The first injection molded element and the second injection molded element are preferably connected to one another in a positively locking and/or integrally joined manner. In particular, the first injection molded element and the second injection molded element can be produced jointly in the two-component injection molding method or in the multiple component injection molding method. The positively locking connection between the first injection molded element and the second injection molded element is realized, for example, by virtue of the fact that the material of the first injection molded element enters into an integrally joined connection with the material of the second injection molded element, for example during the injection molding.

In accordance with a further embodiment, the second injection molded element adjoins an outer surface of the fuel tank. In the direction of the receiving space, the second injection molded element preferably does not adjoin the inner surface of the fuel tank or the receiving space.

In a freshly molded state, the first injection molded element preferably has a modulus of elasticity which is at least three times as great as the modulus of elasticity of the second injection molded element in a freshly molded state.

In accordance with a further embodiment, the first injection molded element has a thermoplastic or consists of a thermoplastic. For example, the first injection molded element can have a polyamide or can consist of a polyamide. The second injection molded element can have, for example, a thermoplastic elastomer or can consist of a thermoplastic elastomer.

For example, in a freshly molded state, the first injection molded element can have a modulus of elasticity of between 1000 and 2500 MPa. In a freshly molded state, the second injection molded element can have, for example, a modulus of elasticity of between 10 and 700 MPa.

Furthermore, in the freshly molded state, the first injection molded element can have, for example, a yield stress of between 50 and 85 MPa. In the freshly molded state, the second injection molded element can have, for example, a yield stress of between 35 and 45 MPa.

The part bodies which are produced from two or more components by way of multiple component injection molding can have a hard/soft connection between various materials. Here, the exterior properties of the fuel tank can be optimized without having a negative influence on internal properties, such as the highly necessary tightness. Different components and/or materials provide different properties, such as strengths, flexibility, wear properties. Crash elements or else rubber coatings can provide additional active and/or passive safety to the rider. The surface becomes grippier and therefore non-slip as a result of the introduction of rubber coatings and/or rubber studs. At the same time, the surface provides active protection against impinging foreign bodies, for example stones.

In accordance with a further embodiment, the part body which is produced by way of the multiple component injection molding method is configured as a fuel tank upper shell. Here, the first injection molded element which, for example, can have a thermoplastic or can consist thereof is preferably configured as a main body of the fuel tank upper shell. The second injection molded element which, for example, can have a thermoplastic elastomer or can consist thereof is preferably configured as a flat surface element. For example, the flat surface element can be integrated or embedded into the main body of the fuel tank upper shell, the flat surface element being configured on the surface of the fuel tank upper shell.

Furthermore, the first part body which is configured as a fuel tank upper shell can have a plurality of second injection molded elements which are integrated into the main body which can be formed, for example, from the first injection molded element. The first part body can have, for example, a left hand side, a tank spine and a right hand side, at least one second injection molded element being configured or integrated into the main body in each of the regions.

The second injection molded elements can serve, for example, as molded protector surfaces for the rider of the single track motor vehicle or the motorcycle, or as bump stops during riding operation or in the case of a crash, that is to say, for example, as knee pads and/or posterior pads. As a result, more safety can be generated for the rider by the impact energy in the case of a crash being absorbed by the tank by way of introduced posterior pads.

In accordance with a further embodiment, the fuel tank has at least one fastening apparatus which has at least one first injection molded element and at least one second injection molded element. The fastening apparatus can be configured on the first part body and/or on the second part body of the fuel tank. The fastening apparatus can be produced, for example, by way of a two-component injection molding method, and have a first injection molded element which can be a part region of the first part body or the second part body. Furthermore, the fastening apparatus can have one or more second injection molded elements which are preferably connected to the first injection molded element in a positively locking and integrally joined manner. The positively locking and integrally joined connection can be, for example, of circumferential and/or flat configuration between the first injection molded element and the second injection molded element or the second injection molded elements. The second injection molded element or the second injection molded elements can in each case have a hollow-cylindrical shape, with the result that connecting elements for attaching the fuel tank can be guided through it/them. Highly satisfactory force and vibration decoupling can be achieved by way of the fastening apparatus.

In accordance with a further embodiment, at least one of the two part bodies has a substrate which is overmolded in an in-mold method. Via the "in-mold method", the visual appearance can be influenced positively. The substrate can be, for example, a film, such as a printed and/or colored film. Furthermore, the substrate can have one or more logos and/or one or more emblems. In this way, a visually sophisticated surface can be produced.

Furthermore, a motor vehicle is specified which has a fuel tank which is described here. The motor vehicle is preferably a single track motor vehicle. In particular, the motor vehicle can be configured as a motorcycle. The fuel tank of the motor vehicle can have one or more features of the abovementioned embodiments. In particular, the fuel tank of the motor vehicle has at least two part bodies which are connected to one another and define a receiving space for receiving fuel, at least one of the two part bodies being produced by way of a multiple component injection molding method.

Furthermore, a method for producing a fuel tank for a motor vehicle is specified. The features which are mentioned above and in the following text in relation to the fuel tank and/or in relation to the method for producing the fuel tank can apply both to the fuel tank per se and also with regard to the method for producing the fuel tank. In particular, the fuel tank which can be produced or is produced by way of the method which is described in the following text can have one or more features of the abovementioned embodiments.

In the case of the method for producing the fuel tank, two part bodies are configured by way of injection molding, at least one of the two part bodies being produced by way of a multiple component injection molding method. Subsequently, the two part bodies are connected, with the result that, after the connecting, the part bodies delimit a receiving space for receiving a fuel.

The connecting of the two part bodies can take place, for example, by way of a welding method. The welding method can be, for example, a laser welding method, a vibration welding method, a contact welding method or a mirror welding method. As a result, the fuel tank can advantageously be of particularly tight and/or impermeable configuration.

In accordance with a further embodiment, at least one first injection molded element and at least one second injection molded element are connected directly to one another in the case of the multiple component injection molding method. The first injection molded element and the second injection molded element preferably have different materials.

For example, the first injection molded element can have a thermoplastic or can consist of a thermoplastic. The thermoplastic can be, for example, a polyamide. The second injection molded element can have, for example, a thermoplastic elastomer or can consist of a thermoplastic elastomer.

In accordance with a further embodiment, the multiple component injection molding method is what is known as an overmolding method. For example, the injection molding die or a part of the injection molding die can be rotated or displaced into a new position after a first injection operation. Subsequently, the pre-molded part can be overmolded in the new position.

In accordance with a further embodiment, a substrate is overmolded in an in-mold method in the case of the configuration of at least one of the two part bodies. The substrate can be, for example, a film, such as a film which is printed with a logo.

By means of the fuel tank which is described here, an optimum utilization of installation space can be achieved by way of an integration of various materials in an injection molded housing. A small amount of manufacturing time is particularly advantageous. The functionality of the fuel tank can be increased by way of the integration of functional elements, such as crash elements. Furthermore, simple coloring of the surface of the fuel tank in desired regions is possible.

Further advantages and advantageous embodiments of the fuel tank which is described here for a motor vehicle and of the method which is described here for producing a fuel tank result from the embodiments which are described in the following text in conjunction with FIGS. 1 to 6.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and Figures, identical or identically acting constituent parts can be provided in each case with the same designations. The elements which are shown and their proportions among one another are fundamentally not to be considered as being true to scale. Rather, individual elements can be shown in a manner which is dimensioned exaggeratedly in terms of thickness or size for improved presentability and/or for improved understanding.

Figure 1:
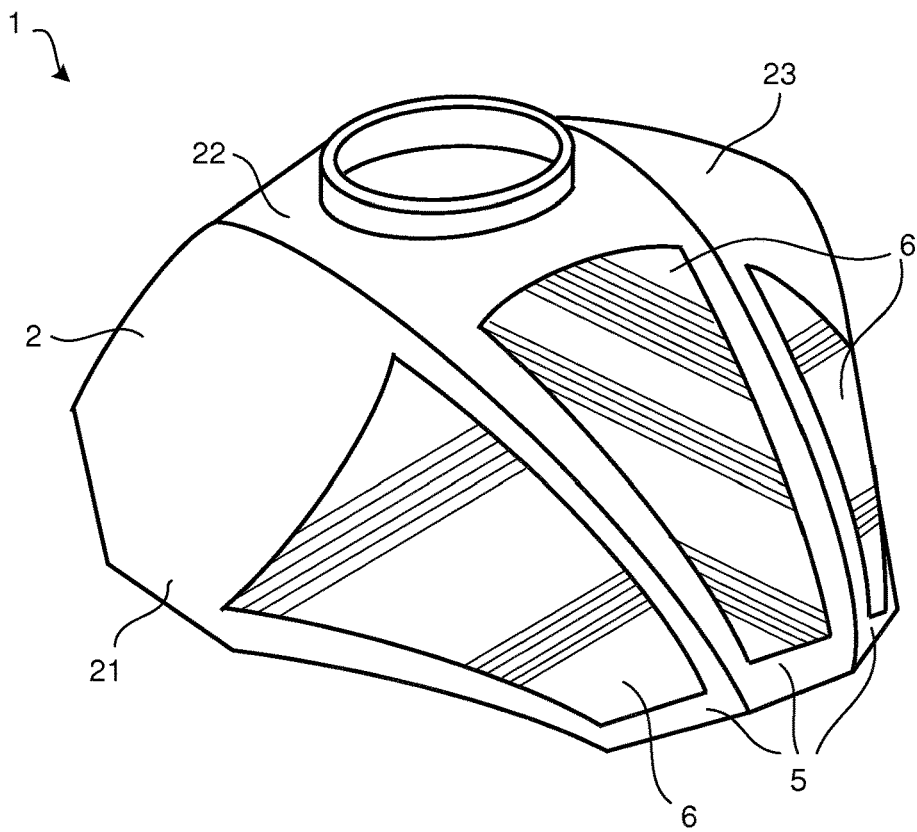
FIGS. 1 and 2 show diagrammatic illustrations of a fuel tank in accordance with one exemplary embodiment.
Figure 2:
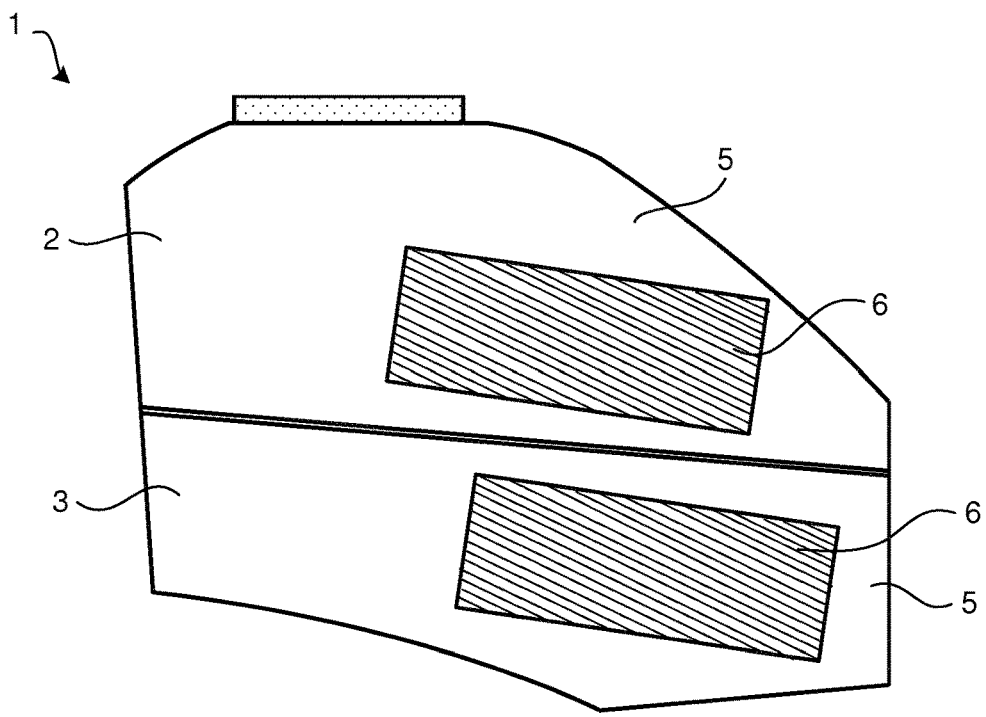

FIGS. 1 and 2 show diagrammatic illustrations of a fuel tank 1 in accordance with one exemplary embodiment, FIG. 1 showing merely a first part body 2 of the fuel tank 1 in a perspective view. FIG. 2 shows the complete fuel tank 1 in a diagrammatic side view.

The fuel tank 1 has two part bodies 2, 3 which are connected to one another and delimit a receiving space for receiving fuel. The two part bodies 2, 3 are produced in each case by way of an injection molding method and are connected to one another by way of a welding method. In particular, the two part bodies 2, 3 are produced in each case by way of a multiple component injection molding method.

The part bodies 2, 3 have in each case one first injection molded element 5 which consists of polyamide in the exemplary embodiment which is shown, and a plurality of second injection molded elements 6 which consist of a thermoplastic elastomer in the exemplary embodiment which is shown. The part bodies 2, 3 are produced, in particular, in each case in a two-component injection molding method. The injection molding method can be, for example, an overmolding method, in the case of which the second injection molded elements 6 are connected in each case in a positively locking and/or integrally joined manner to the first injection molded element 5, by way of which the main body of the first and second part body 2, 3 is formed.

In the exemplary embodiment which is shown, the first part body 2 which forms the tank upper shell of the fuel tank 1 has a left hand side 21, a right hand side 23 and a tank spine 22 which is arranged in between. Here, in each case one second injection molded element 6 is provided both in the region of the left hand side 21, in the region of the tank spine 22 and in the region of the right hand side 23.

The tank lower shell of the fuel tank 1, which tank lower shell is formed by way of the second part body 3, also has a plurality of second injection molded elements 6 which are embedded into the injection molded element 5 which forms the main body of the tank lower shell. The second injection molded elements 6 can serve, for example, as protector surfaces, such as knee pads or posterior pads. Furthermore, the second injection molded elements 6 can have a surface with rubber studs which is particularly grippy.

Figure 3:
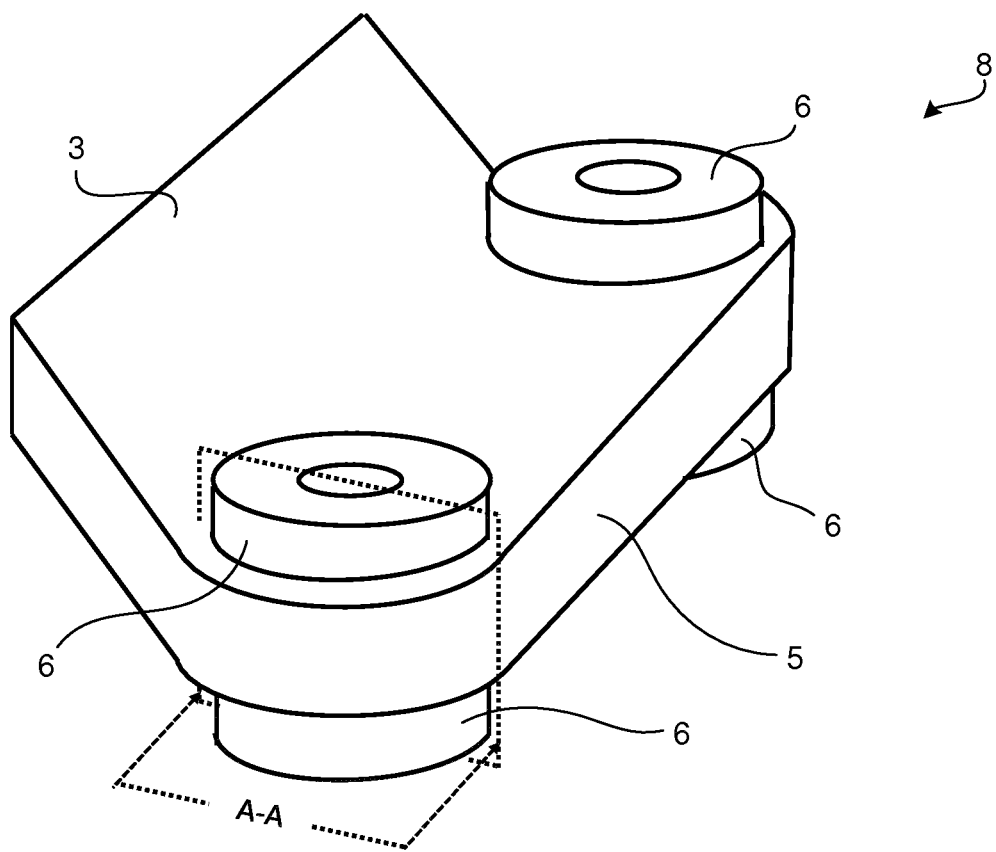
FIGS. 3 and 4 show diagrammatic illustrations of a fastening apparatus of a fuel tank in accordance with one exemplary embodiment.
Figure 4:
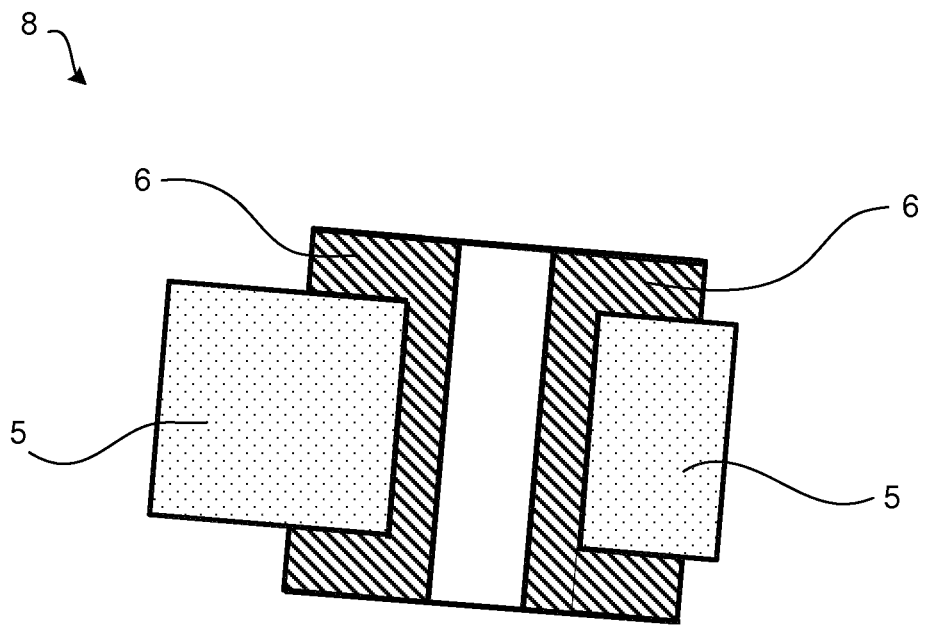

FIGS. 3 and 4 show a fastening apparatus 8 of a fuel tank 1 in a perspective view and in a sectional view, respectively. In particular, the section in FIG. 4 is depicted along A-A from FIG. 3.

The fastening apparatus 8 can be configured on the first part body 2 and/or on the second part body 3 of the fuel tank. The fastening apparatus 8 is produced by way of a two-component injection molding method, and has a first injection molded element 5 which can be a part region of the first part body 2 or the second part body 3, and two second injection molded elements 6 which are connected to the first injection molded element 5 in a positively locking and integrally joined manner. The second injection molded elements 6 in each case have a hollow-cylindrical shape, and preferably consist of a thermoplastic elastomer. The first injection molded element 5 preferably consists of a thermoplastic, such as of polyamide.

In each case one connecting element for fastening the fuel tank 1 to a further body can be guided through the second injection molded elements 6. Force and vibration decoupling between the fuel tank 1 and the further body, to which the fuel tank is fastened, can be achieved in a particularly inexpensive manner by way of the fastening apparatus 8.

Figure 5:
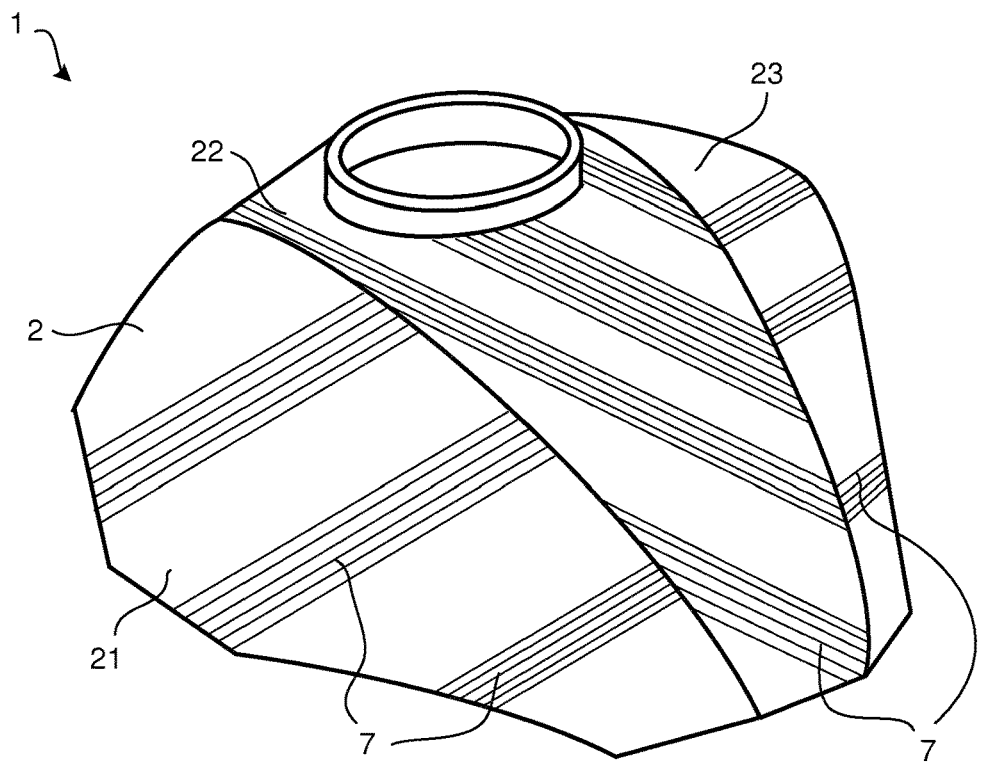
FIGS. 5 and 6 show diagrammatic illustrations of a fuel tank in accordance with a further exemplary embodiment.
Figure 6:
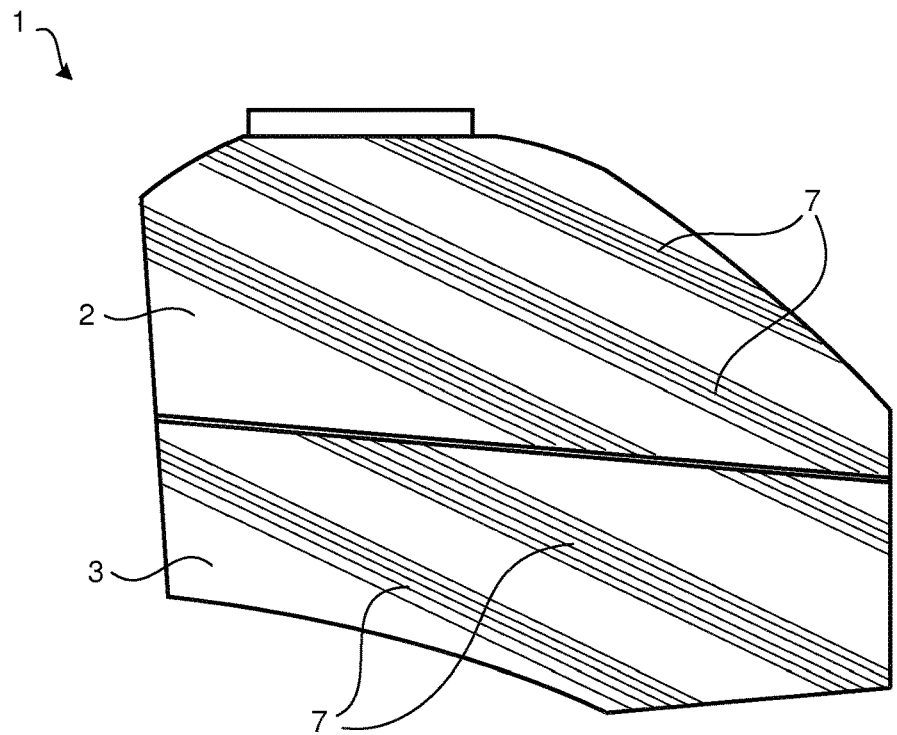

FIGS. 5 and 6 show diagrammatic views of a fuel tank 1 in accordance with a further exemplary embodiment. The fuel tank 1 once again has two part bodies 2, 3 which are connected to one another and delimit a receiving space for receiving fuel, at least one of the two part bodies 2, 3 being produced by way of a multiple component injection molding method. For example, at least one of the two part bodies 2, 3 has a first injection molded element and a second injection molded element (not shown) which is connected directly to the first injection molded element, which injection molded elements are produced by way of a two-component injection molding method and preferably in each case have a different material or consist of different materials.

Furthermore, the two part bodies 2, 3 in each case have a plurality of substrates 7 which are overmolded by way of an in-mold method. The substrates can be, for example, films, such as films with a logo, an emblem and/or a graphic (in particular, multiple-color) design.

The features which are described in the exemplary embodiments which are shown can also be combined with one another in accordance with further exemplary embodiments. As an alternative or in addition, the exemplary embodiments which are shown in the Figures can have further features in accordance with the embodiments of the general description.

LIST OF REFERENCE CHARACTERS

1 Fuel tank
2 First part body
3 Second part body
5 First injection molded element
6 Second injection molded element
7 Substrate
8 Fastening apparatus
21 Left hand side of the tank upper shell
22 Tank spine of the tank upper shell
23 Right hand side of the tank upper shell The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel tank of a motorcycle, comprising:
a first part body; and
a second part body;
wherein the first and second part bodies are connected to one another, wherein a receiving space for receiving a fuel is defined by the connected first and second part bodies, and wherein at least one of the first and second part bodies is produced by a two-component injection molding method;
wherein the at least one of the first and second part bodies which is produced by the two-component injection molding method has a first injection molded element and a second injection molded element which are connected directly to one another and which are formed from different materials;
wherein the at least one of the first and second part bodies which is wherein the at least one of the first and second part bodies which is produced by the two-component injection molding method is configured as a fuel tank upper shell, wherein the first injection molded element forms a main body of the fuel tank upper shell, and wherein the second injection molded element is disposed on a surface of the fuel tank upper shell, is a flat surface element, and is a safety element for a rider of the motorcycle;
wherein the safety element is a protector surface and wherein the protector surface is a knee pad or a posterior pad;
wherein the first injection molded element consists of a polyamide and wherein the second injection molded element consists of a thermoplastic elastomer;
wherein the first and second injection molded elements are connected directly to one another in a positively locking manner such that the material of the first injection molded element enters into an integrally joined connection with the material of the second injection molded element.

2. The fuel tank according to claim 1 further comprising a fastening apparatus which has a third injection molded element and a fourth injection molded element, wherein the fastening apparatus is configured on the first part body and/or on the second part body.

3. The fuel tank according to claim 1, wherein at least one of the first and second part bodies has a substrate which is overmolded in an in-mold method.

4. The fuel tank according to claim 1, wherein the second injection molded element has a surface with rubber studs.

5. A method for producing a fuel tank of a motorcycle, comprising the acts of:
configuring of a first part body and a second part body by injection molding, wherein at least one of the first and second part bodies is produced by a two-component injection molding method; and
connecting the first and second part bodies such that, after the connecting, the first and second part bodies define a receiving space for receiving a fuel;
wherein the at least one of the first and second part bodies which is produced by the two-component injection molding method has a first injection molded element and a second injection molded element which are connected directly to one another and which are formed from different materials;
wherein the at least one of the first and second part bodies which is wherein the at least one of the first and second part bodies which is produced by the two-component injection molding method is configured as a fuel tank upper shell, wherein the first injection molded element forms a main body of the fuel tank upper shell, wherein the second injection molded element is disposed on a surface of the fuel tank upper shell, is a flat surface element, and is a safety element for a rider of the motorcycle, wherein the safety element is a protector surface, wherein the protector surface is a knee pad or a posterior pad, wherein the first injection molded element consists of a polyamide, wherein the second injection molded element consists of a thermoplastic elastomer, and wherein the first and second injection molded elements are connected directly to one another in a positively locking manner such that the material of the first injection molded element enters into an integrally joined connection with the material of the second injection molded element.

6. The method according to claim 5, wherein the two-component injection molding method is an overmolding method.

7. The method according to claim 5 further comprising the act of overmolding a substrate in an in-mold method on at least one of the first and second part bodies.

* * * * *